United States Patent
Chen et al.

(10) Patent No.: US 12,002,994 B2
(45) Date of Patent: Jun. 4, 2024

(54) BATTERY MODULE, BATTERY PACK, AND BATTERY-POWERED APPARATUS

(71) Applicant: CONTEMPORARY AMPEREX TECHNOLOGY CO., LIMITED, Fujian (CN)

(72) Inventors: Xingdi Chen, Fujian (CN); Mingdi Xie, Fujian (CN); Kaijie You, Fujian (CN); Peng Wang, Fujian (CN); Yu Tang, Fujian (CN); Yongguang Wang, Fujian (CN)

(73) Assignee: CONTEMPORARY AMPEREX TECHNOLOGY CO., LIMITED, Fujian (CN)

( * ) Notice: Subject to any disclaimer, the term of this patent is extended or adjusted under 35 U.S.C. 154(b) by 0 days.

(21) Appl. No.: 17/488,437

(22) Filed: Sep. 29, 2021

(65) Prior Publication Data
US 2022/0021082 A1    Jan. 20, 2022

Related U.S. Application Data

(63) Continuation of application No. PCT/CN2020/083248, filed on Apr. 3, 2020.

(51) Int. Cl.
*H01M 10/00*    (2006.01)
*H01M 10/0585*    (2010.01)
(Continued)

(52) U.S. Cl.
CPC ..... *H01M 50/507* (2021.01); *H01M 10/0585* (2013.01); *H01M 50/209* (2021.01); *H01M 50/553* (2021.01); *H01M 2220/20* (2013.01)

(58) Field of Classification Search
CPC ........... H01M 50/507; H01M 10/0585; H01M 50/209; H01M 50/553; H01M 2220/20
See application file for complete search history.

(56) References Cited

U.S. PATENT DOCUMENTS

2010/0266887 A1* 10/2010 Sekino .............. H01M 10/0436
429/123
2012/0244404 A1* 9/2012 Obasih ..................... F28F 3/02
429/99
(Continued)

FOREIGN PATENT DOCUMENTS

CN    204706600 U    10/2015
CN    204793019 U    11/2015
(Continued)

OTHER PUBLICATIONS

International Search Report dated Jan. 6, 2021 issued in PCT/CN2020/083248.
(Continued)

*Primary Examiner* — Nicholas P D'Aniello
(74) *Attorney, Agent, or Firm* — Scully, Scott, Murphy & Presser, P.C.

(57) ABSTRACT

The present application provides a battery module, a battery pack, and a battery-powered apparatus. The battery module includes a plurality of battery units and a busbar assembly. The plurality of battery units are arranged in a horizontal direction, where each battery unit includes a plurality of batteries stacked in a vertical direction, the plurality of batteries include a first battery and a second battery, the first battery and the second battery each include a first electrode terminal, a second electrode terminal, and an explosion-proof piece. A busbar assembly electrically connects the plurality of battery units, where the busbar assembly includes a first busbar connected to the first electrode terminal and the second electrode terminal. In a first direction perpendicular to the vertical direction and the horizontal direction, the first busbar includes a first weak zone that at least partially overlaps with the explosion-proof piece of the first battery.

15 Claims, 5 Drawing Sheets

(51) Int. Cl.
*H01M 50/209* (2021.01)
*H01M 50/507* (2021.01)
*H01M 50/553* (2021.01)

(56) References Cited

U.S. PATENT DOCUMENTS

| | | | | |
|---|---|---|---|---|
| 2013/0323549 | A1* | 12/2013 | Choi | H01M 50/507 |
| | | | | 429/62 |
| 2018/0294465 | A1* | 10/2018 | Nagai | H01M 50/543 |
| 2019/0372083 | A1* | 12/2019 | Ryu | H01M 50/105 |
| 2020/0083512 | A1 | 3/2020 | Son et al. | |
| 2022/0271389 | A1* | 8/2022 | Torazawa | H01M 50/3425 |

FOREIGN PATENT DOCUMENTS

| | | |
|---|---|---|
| CN | 205882057 U | 1/2017 |
| CN | 109728208 A | 5/2019 |
| CN | 209104250 U | 7/2019 |
| CN | 209447876 U | 9/2019 |
| CN | 209709060 U | 11/2019 |
| CN | 209730034 U | 12/2019 |
| CN | 110890508 A | 3/2020 |
| JP | H0794166 A | 4/1995 |
| JP | 2011253735 A | 12/2011 |
| JP | 2017091647 A | 5/2017 |
| JP | 2019220433 A | 12/2019 |
| WO | 2020003801 A1 | 1/2020 |

OTHER PUBLICATIONS

Written Opinion dated Jan. 6, 2021 issued in PCT/CN2020/083248.
Decision to Grant a Patent dated Nov. 21, 2022 received in Japanese Patent Application No. JP 2022-530274.
Notice of Allowance dated Mar. 21, 2023 received in Korean Patent Application No. KR 10-2022-7016761.
First Office Action dated Jul. 17, 2023 received in Chinese Patent Application No. CN 202080068519.7.

* cited by examiner

BATTERY MODULE, BATTERY PACK, AND BATTERY-POWERED APPARATUS

CROSS-REFERENCE TO RELATED APPLICATIONS

The present application is a continuation of International Application No. PCT/CN2020/083248, filed on Apr. 3, 2020, the disclosure of which is hereby incorporated by reference in its entirety.

TECHNICAL FIELD

The present application relates to the battery field, and in particular, to a battery module, a battery pack, and a battery-powered apparatus.

BACKGROUND

Secondary batteries such as lithium-ion batteries are widely used in electronic apparatuses such as mobile phones and notebook computers due to their high energy densities and environmental friendliness. In recent years, to cope with environmental issues, gasoline price issues, and energy storage issues, application of the lithium-ion batteries has been quickly expanded to gasoline-electric hybrid vehicles, vessels, energy storage systems, and the like.

A battery typically includes a housing, an electrode assembly accommodated in the housing, and electrode terminals exposed outside the housing. The electrode assembly includes a positive electrode plate, a negative electrode plate, and a separator separating the positive electrode plate from the negative electrode plate. Medium- or large-sized devices such as electric vehicles and hybrid electric vehicles require high power and large capacity, and therefore, a plurality of batteries used therein are usually connected in groups through busbars. However, when thermal runaway occurs in a specific battery due to a reason such as overcharging or a short circuit, if the circuit is not disconnected in a timely manner, thermal runaway is prone to occur in a battery adjacent to the battery with thermal runaway, thus leading to thermal runaway in a plurality of batteries consecutively, which in turn causes a safety incident such as a fire or an explosion.

SUMMARY

In view of the existing problem in the prior art, an objective of the present application is to provide a battery module, a battery pack, and a battery-powered apparatus, which can reduce a risk of thermal runaway of a battery and improve safety performance.

To achieve the foregoing objective, the present application provides a battery module, including a plurality of battery units and a busbar assembly. The plurality of battery units are arranged in a horizontal direction, where each battery unit includes a plurality of batteries stacked in a vertical direction, the plurality of batteries include a first battery and a second battery stacked in a vertical direction, the first battery and the second battery each include a first electrode terminal, a second electrode terminal, and an explosion-proof piece located between the first electrode terminal and the second electrode terminal. A busbar assembly electrically connects the plurality of battery units, where the busbar assembly includes a first busbar connected to the first electrode terminal of the first battery and the second electrode terminal of the second battery. In a first direction perpendicular to the vertical direction and the horizontal direction, the first busbar includes a first weak zone that at least partially overlaps with the explosion-proof piece of the first battery. The first weak zone is configured to fracture when the explosion-proof piece of the first battery is burst, to cause an open circuit between the first battery and the second battery.

In the battery module according to some embodiments, the first busbar further has a first through hole, the first weak zone includes a first portion and a second portion, and the first portion and the second portion are respectively located on two sides of the first through hole. In the first direction, the first portion at least partially overlaps with the explosion-proof piece, and the second portion at least partially overlaps with the explosion-proof piece.

In the battery module according to some embodiments, the explosion-proof piece of the first battery has an exposed zone, and the exposed zone is not covered by the first busbar in the first direction.

In the battery module according to some embodiments, the exposed zone includes a first exposed portion facing toward the first through hole.

In the battery module according to some embodiments, the exposed zone further includes a second exposed portion, and the second exposed portion is spaced apart from the first exposed portion.

In the battery module according to some embodiments, the first busbar further includes a first connection portion and a transition portion. The first connection portion is connected to the first electrode terminal of the first battery, and the first weak zone is connected to the first connection portion and the transition portion. The transition portion has a buffer zone, and the buffer zone is configured to: flexibly deform when a distance in the horizontal direction between the first electrode terminal of the first battery and the second electrode terminal of the second battery changes; and/or flexibly deform when a distance in the vertical direction between the first electrode terminal of the first battery and the second electrode terminal of the second battery changes.

In the battery module according to some embodiments, the first busbar further includes a second connection portion and a second weak zone. The second connection portion is connected to the second electrode terminal of the second battery. The second weak zone at least partially overlaps with the explosion-proof piece of the second battery in the first direction, and the second weak zone is connected to the transition portion and the second connection portion. The second weak zone is configured to fracture when the explosion-proof piece of the second battery is burst, to cause an open circuit between the first battery and the second battery.

In the battery module according to some embodiments, the buffer zone is provided obliquely relative to the vertical direction and the horizontal direction.

In the battery module according to some embodiments, the buffer zone is located in the vertical direction between the explosion-proof piece of the first battery and the explosion-proof piece of the second battery.

In the battery module according to some embodiments, the buffer zone includes a plurality of arched structures.

In the battery module according to some embodiments, the first electrode terminal and the second electrode terminal of the first battery are arranged in the horizontal direction. The first electrode terminal and the second electrode terminal of the second battery are arranged in the horizontal direction. The first electrode terminal of the first battery and the first electrode terminal of the second battery are oppositely disposed in the vertical direction, and the second electrode terminal of the first battery and the second electrode terminal of the second battery are oppositely disposed in the vertical direction.

In the battery module according to some embodiments, a size of the battery module in the horizontal direction is greater than a size of the battery module in the vertical direction.

In the battery module according to some embodiments, each battery further includes a housing and an electrode assembly, where the first electrode terminal, the second electrode terminal, and the explosion-proof piece are disposed at the housing, the electrode assembly is accommodated in the housing, the electrode assembly includes a first electrode plate, a second electrode plate, and a separator separating the first electrode plate from the second electrode plate, the first electrode plate is electrically connected to the first electrode terminal, and the second electrode plate is electrically connected to the second electrode terminal.

In the battery module according to some embodiments, the electrode assembly is a flat-shaped winding structure, where an outer surface of the electrode assembly includes two flat surfaces, and the two flat surfaces face each other in the vertical direction. In the battery module according to some other embodiments, the electrode assembly is a laminated structure, where the first electrode plate, the separator, and the second electrode plate are laminated in the vertical direction.

The present application further provides a battery pack, including a box body and the foregoing battery module, and the battery module is accommodated in the box body.

The present application further provides a battery-powered apparatus, including the foregoing battery module.

Beneficial effects of the present application are as follows: Because the first weak zone at least partially overlaps with the explosion-proof piece, when the explosion-proof piece is burst, a gas at high temperature and high pressure directly strikes the first weak zone; and the first weak zone is less strong and fractures under the impact of the gas, thereby disconnecting the electrical connection between the first battery and the second battery. At this point, charging and discharging of the second battery has been stopped. Even if heat of the first battery is transferred to the second battery, the second battery is not prone to thermal runaway, thereby reducing a risk of safety incidents such as a fire or an explosion and improving safety performance of the battery module.

Figure 1:
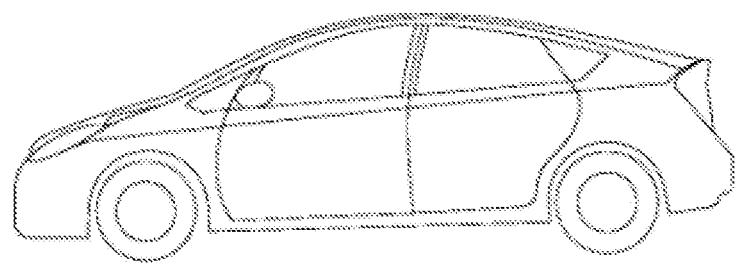
FIG. 1 is a schematic diagram of a battery-powered apparatus according to some embodiments.

Reference signs are described as follows:

| | |
|---|---|
| 1. battery unit | 21. first busbar |
| 11. battery | 211. first weak zone |
| 111. first electrode terminal | 211a. first portion |
| 112. second electrode terminal | 211b. second portion |
| 113. explosion-proof piece | 212. first through hole |
| 113a. first exposed portion | 213. first connection portion |
| 113b. second exposed portion | 214. second connection portion |
| 114. housing | 215. transition portion |
| 114a. casing | 215a. elastic zone |
| 114b. top cover | 216. second weak zone |
| 115. electrode assembly | 217. second through hole |
| 115a. first electrode plate | 22. second busbar |
| 115b. second electrode plate | 23. output electrode plate |
| 115c. separator | 1000. battery module |
| 115d. flat surface | 2000. box body |
| 115e. narrow side | X. length direction |
| 11a. first battery | Y. width direction |
| 11b. second battery | Z. vertical direction |
| 2. busbar assembly | |

DESCRIPTION OF EMBODIMENTS

To make the objectives, technical solutions, and advantages of this application more comprehensible, the following describes this application in detail with reference to embodiments and accompanying drawings. It should be understood that the specific embodiments described herein are merely used to explain this application but are not intended to limit this application.

In the descriptions of this application, unless otherwise specified and defined explicitly, the terms "first", "second", and "third" are merely intended for a purpose of description, and should not be understood as any indication or implication of relative importance; the term "plurality of" indicates two or more (including two); and unless otherwise specified and defined explicitly, the term "connection" should be understood in their general senses. For example, the "connection" may be a fixed connection, a detachable connection, an integrated connection, an electrical connection, or a signal connection; and the "connection" may be a direct connection, or an indirect connection through an intermediate medium. A person of ordinary skill in the art can understand specific meanings of these terms in this application based on specific situations.

In the descriptions of this application, in all the accompanying drawings, a direction to which an arrow X points is a length direction, a direction to which an arrow Y points is a width direction, and a direction to which an arrow Z points is a vertical direction. A horizontal direction is a direction parallel to a horizontal plane, and may be either the length direction X or the width direction Y. In addition, the horizontal direction not only includes a direction that is absolutely parallel to the horizontal plane, but also includes a direction that is approximately parallel to the horizontal plane, as commonly known in engineering. The vertical direction is a direction perpendicular to the horizontal plane. The vertical direction not only includes a direction that is absolutely vertical to the horizontal plane, but also includes a direction that is approximately perpendicular to the horizontal plane, as commonly known in engineering. In addition, orientation terms such as "upper", "lower", "top", and "bottom" described in this application are all understood relative to the vertical direction Z. For ease of understanding and description, the directions are described below based on an X, Y, and Z coordinate system in the accompany drawings.

This application provides a battery-powered apparatus, and the apparatus includes a main body and a battery module installed on the main body. The apparatus is an electric vehicle, a hybrid electric vehicle, a vessel, or the like. Referring to FIG. 1, in some embodiments, the apparatus is an electric vehicle, and the electric vehicle is a battery electric vehicle, or may be a hybrid vehicle or an extended-range vehicle. The electric vehicle includes a chassis, a body, and an electric drive system. The electric drive system includes a drive module and a power supply module. The drive module includes structures such as a motor, a mechanical transmission apparatus, and wheels, and the power supply module includes a plurality of secondary batteries. The battery module drives the wheels to rotate through the motor and the mechanical transmission apparatus, thereby driving the vehicle to move. The secondary battery is a lead-acid battery, a nickel-cadmium battery, a nickel-hydrogen battery, or a lithium-ion battery. In some embodiments, the secondary battery is the lithium-ion battery.

Figure 2:
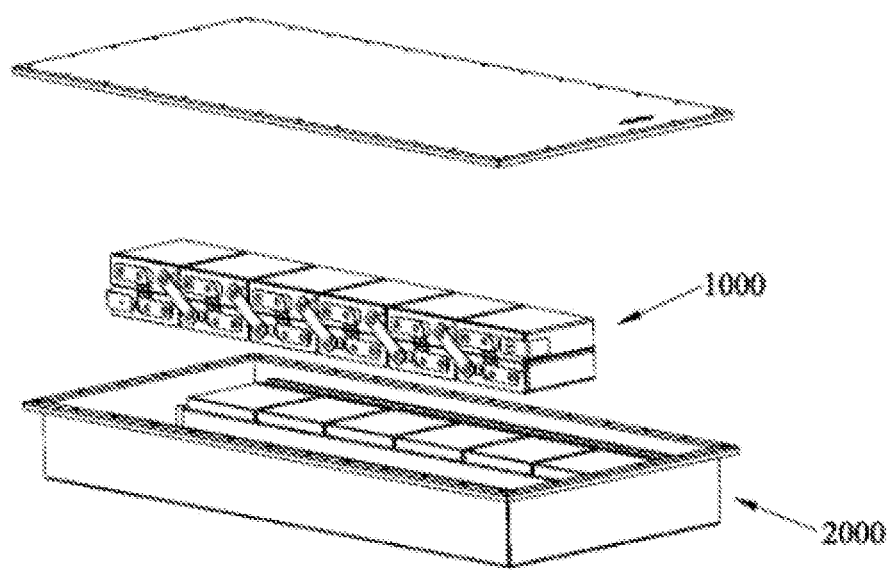
FIG. 2 is an exploded view of a battery pack according to some embodiments.

Referring to FIG. 2, this application further provides a battery pack. The battery pack includes a battery module 1000 and a box body 2000, and the battery module 1000 is accommodated in the box body 2000. The box body 2000 includes a lower box body and an upper box cover, the lower box body and the upper box cover are connected in a sealed manner, and an accommodation cavity is formed between the lower box body and the upper box cover. The lower box body and the upper box cover are made of aluminum, an aluminum alloy, or other metals. The battery module 1000 is accommodated in the accommodation cavity of the box body 2000. There may be one or more battery modules 1000. When a plurality of battery modules 1000 are provided, the battery modules 1000 may be arranged in the length direction X or the width direction Y. The battery module 1000 includes a plurality of secondary batteries, and the secondary batteries are lead-acid batteries, nickel-cadmium batteries, nickel-hydrogen batteries, or lithium-ion batteries.

Figure 3:
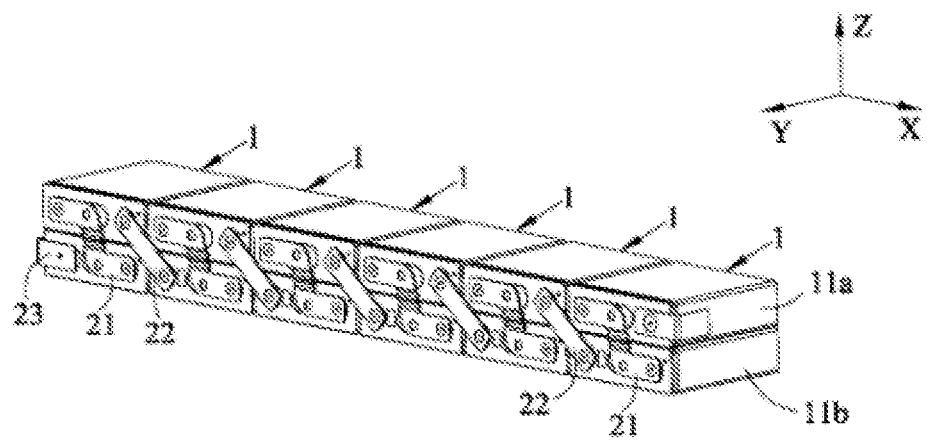
FIG. 3 is a schematic diagram of a battery module according to some embodiments.

This application further provides a battery module. The battery module includes a plurality of battery units 1 arranged in a horizontal direction, and each battery unit 1 includes a plurality of batteries 11 stacked in a vertical direction Z. Referring to FIG. 3, in some embodiments, the plurality of battery units 1 of the battery module are arranged in a length direction X.

Figure 7:
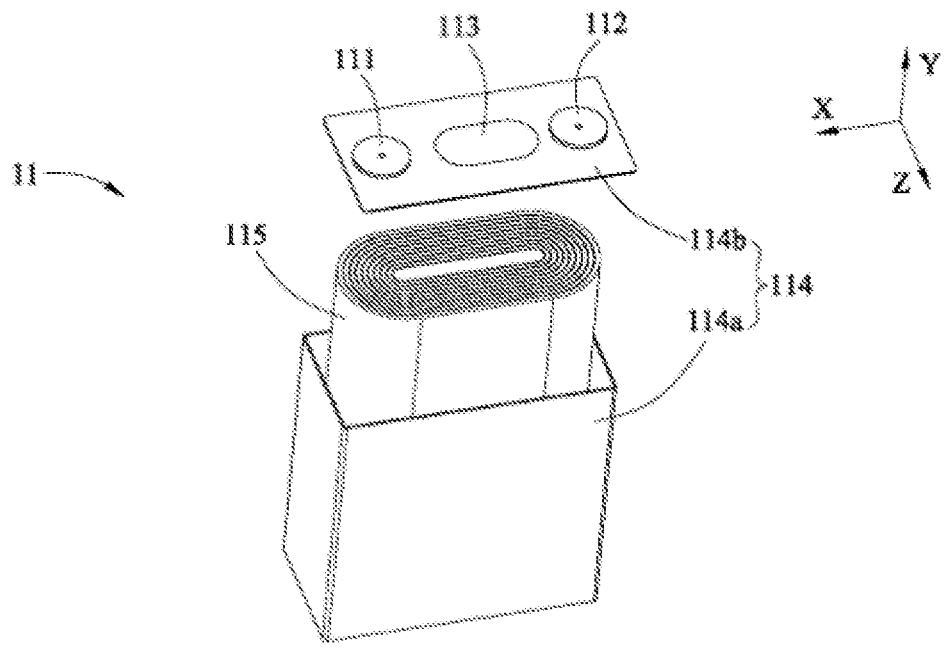
FIG. 7 is an exploded view of a battery according to some embodiments.

Referring to FIG. 7, in some embodiments, each battery 11 of the battery module includes a first electrode terminal 111, a second electrode terminal 112, an explosion-proof piece 113, a housing 114, and an electrode assembly 115.

Figure 8:
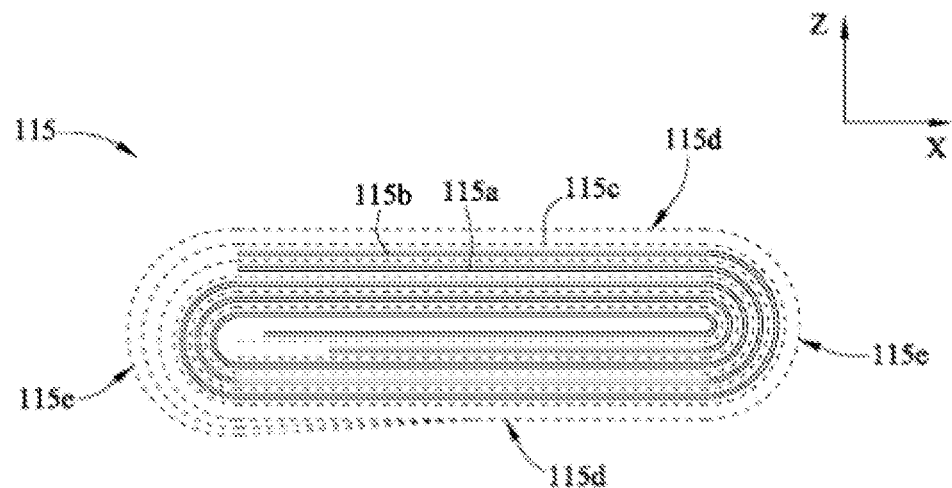
FIG. 8 is a cross-sectional view of an electrode assembly according to some embodiments.
Figure 9:
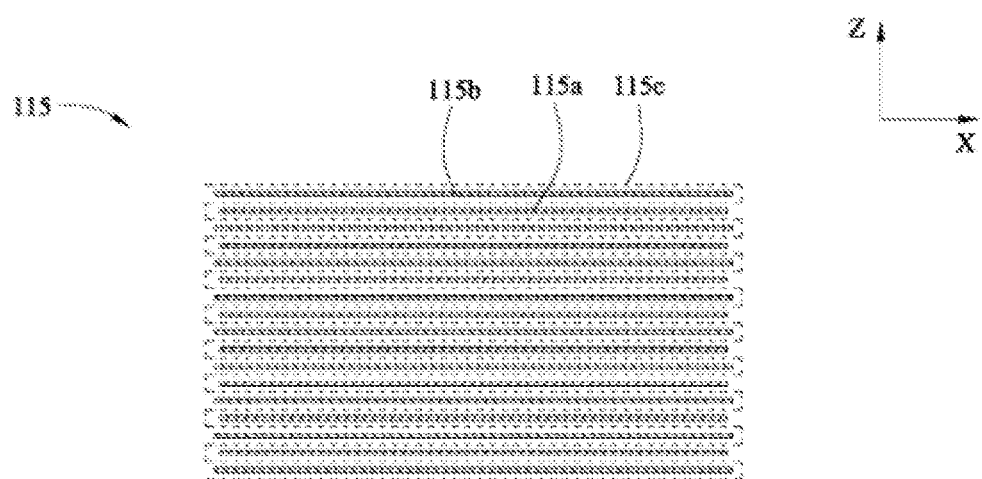
FIG. 9 is a cross-sectional view of an electrode assembly according to some other embodiments.

The electrode assembly 115 is a core member of the battery 11 that is configured to implement charge and discharge functions. Referring to FIG. 8 and FIG. 9, an electrode assembly 2 includes a first electrode plate 115a, a second electrode plate 115b, and a separator 115c separating the first electrode plate 115a from the second electrode plate 115b. The first electrode terminal 111 and the second electrode terminal 112 are electrically connected to the first electrode plate 115a and the second electrode plate 115b respectively.

The first electrode plate 115a includes a first current collector and a first active substance layer coated on a surface of the first current collector. The second electrode plate 115b includes a second current collector and a second active substance layer coated on a surface of the second current collector. In some embodiments, the first electrode plate 115a is a positive electrode plate, the first current collector is aluminum foil, and the first active substance layer includes lithium manganate oxide, lithium iron phosphate, or a ternary material. The second electrode plate 115b is a negative electrode plate, the first current collector is copper foil, and the second active material layer includes graphite or silicon.

The housing 114 has an inner cavity to accommodate the electrode assembly 115 and an electrolyte. Referring to FIG. 7, the housing 114 includes a casing 114a and a top cover 114b connected to the casing 114a. The casing 114a is in a hexahedral shape or another shape. The casing 114a has an opening, and the electrode assembly 115 may be placed into the casing 114a through the opening. A size of the top cover 114b fits a size of the opening of the casing 114a. The top cover 114b is connected to the casing 114a through welding and covers the opening of the casing 114a.

The first electrode terminal 111 and the second electrode terminal 112 are disposed at the housing 114 and exposed out of the housing 114. In some embodiments, the first electrode terminal 111 and the second electrode terminal 112 protrude from the top cover 114b.

The explosion-proof piece 113 is disposed at the housing 114 and located between the first electrode terminal 111 and the second electrode terminal 112. In some embodiments, the top cover 114b is provided with a through vent hole, and the explosion-proof piece 113 is fixed to the top cover 114b and covers the vent hole. When the electrode assembly 115 generates a large amount of gas due to overcharging, a short circuit, or the like, air pressure inside the housing 114 increases, the explosion-proof 113 is burst apart, and the gas is expelled to the outside of the housing 114 through the vent hole, thereby avoiding explosion of the battery 11.

Referring to FIG. 3, the battery module further includes a busbar assembly 2, and the busbar assembly 2 electrically connects a plurality of battery units 1 of the battery module. The busbar assembly 2 includes a plurality of busbars, and each busbar is connected to the electrode terminal in a manner such as welding or riveting. The plurality of busbars connect the plurality of batteries 11 in the battery module in series, in parallel, or in a serial and parallel connection manner to form a group.

Figure 4:
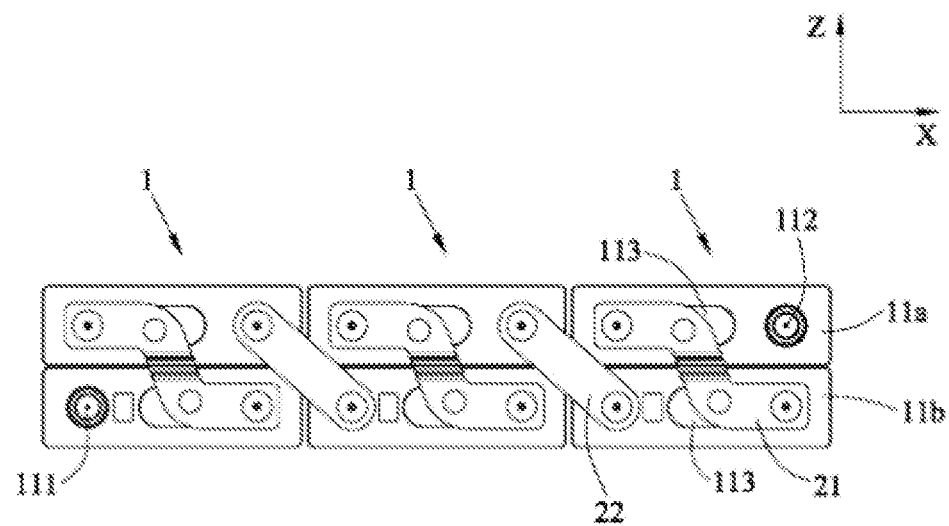
FIG. 4 is a schematic diagram of a battery module according to some other embodiments.
Figure 5:
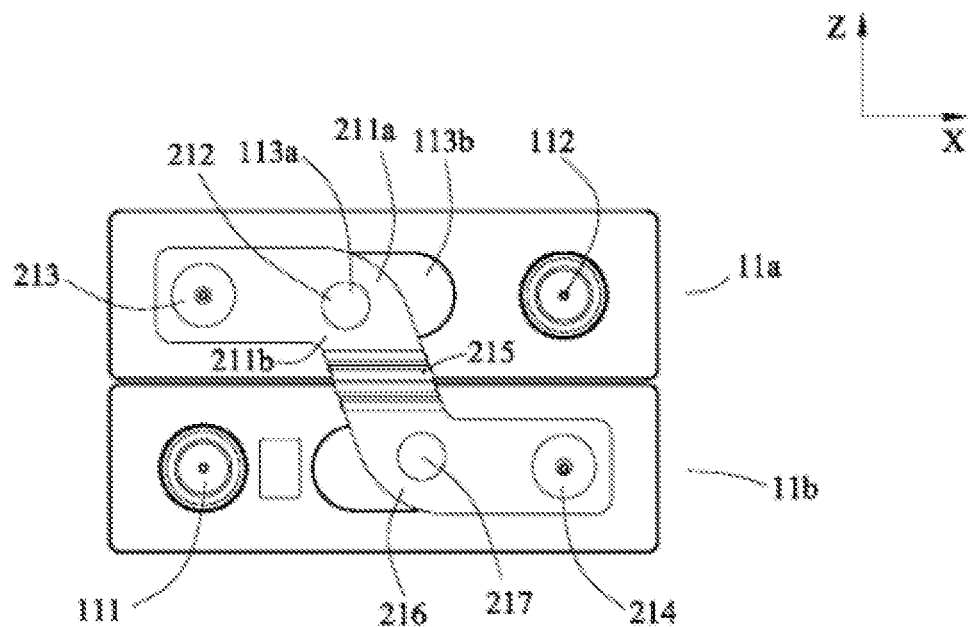
FIG. 5 is a schematic diagram of a battery unit and a first busbar in some embodiments.

Referring to FIG. 3 to FIG. 5, the plurality of batteries 11 in the battery module includes a first battery 11a and a second battery 11b stacked in the vertical direction Z. The busbar assembly 2 includes a first busbar 21 connected to the first electrode terminal 111 of the first battery 11a and the second electrode terminal 112 of the second battery 11b.

In a first direction perpendicular to the vertical direction and the horizontal direction, the first busbar 21 includes a first weak zone 211 that at least partially overlaps with the explosion-proof piece 113 of the first battery 11a. In some embodiments, the plurality of battery units 1 of the battery module are arranged in a length direction X. In this case, the first direction is parallel to the width direction Y shown in the figure. In a plane perpendicular to the first direction, a projection of the explosion-proof piece 113 of the first battery 11a at least partially overlaps with a projection of the first weak zone 211. The first weak zone 211 is configured to fracture when the explosion-proof piece 113 is burst, to cause an open circuit between the first battery 11a and the second battery 11b.

When the electrode assembly 115 of the first battery 11a generates a large amount of gas due to overcharging, a short circuit, or the like, air pressure inside the housing 114 increases, and the explosion-proof piece 113 is burst. Because the first weak zone 211 overlaps with at least a portion of the explosion-proof piece 113, a gas at high temperature and high pressure directly strikes the first weak zone 211; and the first weak zone 211 is less strong and fractures under the impact of the gas, thereby disconnecting the electrical connection between the first battery 11a and the second battery 11b. At this point, charging and discharging of the second battery 11b has been stopped. Even if heat of the first battery 11a is transferred to the second battery 11b, the second battery 11b is not prone to thermal runaway, thereby reducing a risk of safety incidents such as a fire or an explosion and improving safety performance of the battery module.

Referring to FIG. 5, in the battery module 1000 according to some embodiments, the explosion-proof piece 113 of the first battery 11a has an exposed zone, and the exposed zone is not covered by the first busbar 21 in the first direction. In a plane perpendicular to the first direction, a projection of the exposed zone does not overlap with a projection of the first busbar 21. The exposed zone is provided, so that blocking of the gas flow by the first busbar 21 can be reduced when the explosion-proof piece 113 is burst, to ensure that the gas inside the first battery 11a is smoothly expelled, thereby reducing the risk of explosion of the first battery 11a.

In some embodiments, referring to FIG. 5, the first busbar 21 further has a first through hole 212, the first weak zone 211 includes a first portion 211a and a second portion 211b, and the first portion 211a and the second portion 211b are respectively located on two sides of the first through hole 212. In this application, the first through hole 212 is provided, to reduce a cross-sectional area of the first portion 211a and a cross-sectional area of the second portion 211b and reduce the strength of the first weak zone 211, thereby ensuring that the first weak zone 113 can fracture when the explosion-proof piece 113 is burst.

In the first direction, the first portion 211a at least partially overlaps with the explosion-proof piece 113, and the second portion 211b at least partially overlaps with the explosion-proof piece 113. When the explosion-proof piece 113 is burst, the first portion 211a and the second portion 211b can fracture under the impact of the gas at the high temperature.

In some embodiments, the exposed zone includes a first exposed portion 113a facing toward the first through hole 212. When the explosion-proof piece 113 is burst, some gas can be expelled through the first through hole 212, thereby increasing a gas expulsion rate and reducing the risk of explosion of the first battery 11a.

In some embodiments, the exposed zone further includes a second exposed portion 113b, and the second exposed portion 113b is spaced apart from the first exposed portion 113a. The second exposed portion 113b is provided, so that an area of a portion of the explosion-proof piece 113 that is covered by the first busbar 21 can be reduced and the gas discharging speed is increased when the explosion-proof piece 113 is burst, thereby reducing the risk of explosion of the first battery 11a.

In some embodiments, the first busbar 21 is provided with a first groove. The first groove is provided, so that thickness of the first weak zone 211 can be decreased in this application to reduce the strength of the first weak zone 211, thereby ensuring that the first weak zone 113 can fracture when the explosion-proof piece 113 is burst. In some other embodiments, the first busbar 21 is provided with two first notches, and the two first notches are respectively located on two sides of the first weak zone 211. The first notches are provided, so that a thickness of the first weak zone 211 can be decreased in this application to reduce the strength of the first weak zone 211, thereby ensuring that the first weak zone 113 can fracture when the explosion-proof piece 113 is burst. In still other embodiments, the first busbar 21 is formed by composing a plurality of conductive materials, and the strength of the first weak zone 211 is less than strength of a portion of the first busbar 21 that is connected to the first weak zone 211, thereby ensuring that the first weak zone 113 can fracture when the explosion-proof piece 113 is burst. In yet other embodiments, the first busbar 21 is formed by composing a plurality of conductive materials, a melting point of the first weak zone 211 is less than that of a portion of the first busbar 21 that is connected to the first weak zone 211. When the gas at the high temperature strikes the first weak zone 211, the first weak zone 211 is heated and softened, thereby ensuring that the first weak zone 113 can fracture when the explosion-proof piece 113 is burst.

In some embodiments, the first busbar 21 further includes a first connection portion 213 and a transition portion 215. The first connection portion 213 is connected to the first electrode terminal 111 of the first battery 11a, and the first weak zone 211 is connected to the first connection portion 213 and the transition portion 215. The first connection portion 213 is welded to the first electrode terminal 111 of the first battery 11a. The first connection portion 213 according to some embodiments is provided with a positioning hole, and the positioning hole helps position the first connection portion 213 during welding.

In a charge and discharge process of the battery 11, swelling deformation of the electrode assembly 115 occurs, the electrode assembly 115 is pressed against the housing 114, and deformation of the housing 114 causes the first electrode terminal 111 and the second electrode terminal 112 of the battery 11 to move. When the electrode assembly 115 of the first battery 11a and the electrode assembly 115 of the second battery 11b swell, a distance between the first electrode terminal 111 of the first battery 11a and the second electrode terminal 112 of the second battery 11b changes, thereby pressing against or stretching the first busbar 21. In an extreme case, a welding portion between the first electrode terminal 111 and the first connection portion 213 may be torn, thereby reducing a current flow capacity. In some embodiments, the transition portion 215 has a buffer zone 215a; and the buffer zone 215a is configured to: flexibly deform when a distance in the horizontal direction between the first electrode terminal 111 of the first battery 11a and the second electrode terminal 112 of the second battery 11b changes; and/or flexibly deform when a distance in the vertical direction between the first electrode terminal 111 of the first battery 11a and the second electrode terminal 112 of the second battery 11b changes. The buffer zone 215a can flexibly deform to absorb the change in the distance between the first electrode terminal 111 of the first battery 11a and the second electrode terminal 112 of the second battery 11b, and reduce a force applied to a welding portion between the first electrode terminal 111 and the first connection portion 213, thereby reducing a risk of tearing the welding portion and ensuring the current flow capacity.

Figure 6:
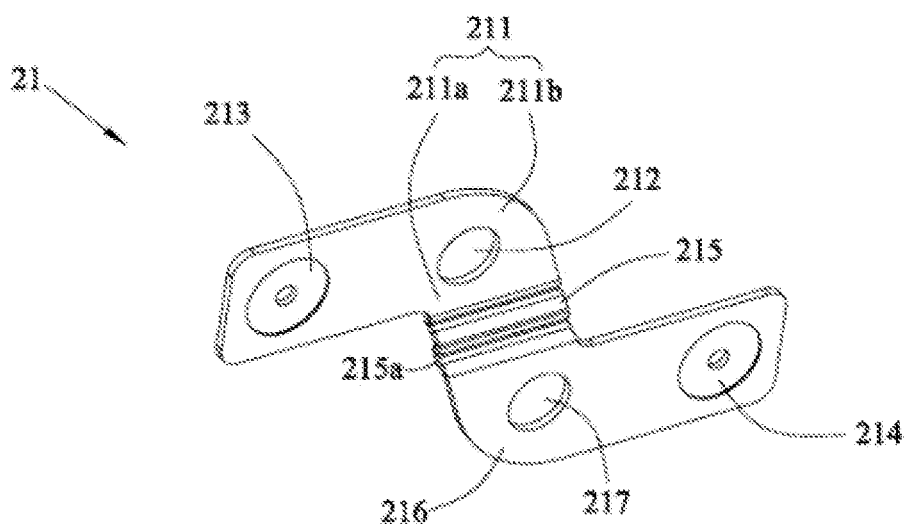
FIG. 6 is a schematic diagram of a first busbar according to some embodiments.

A structure of the buffer zone 215a can be set based on requirements, provided that a force required for the deformation of the buffer zone 215a is less than a connection force between the first electrode terminal 111 and the first connection portion 213. In some embodiments, referring to FIG. 6, the buffer zone 215a includes a plurality of arched structures, and the plurality of arched structures form a continuous waveform structure. The plurality of arched structures have good elasticity, and can deform to absorb the change in the distance between the first electrode terminal 111 of the first battery 11a and the second electrode terminal 112 of the second battery 11b. The arched structures are formed by stamping the transition portion 215.

In some other embodiments, the buffer zone 215a includes a plurality of spaced strip structures, and at least a portion of each strip structure is bent into an arc shape. The arc-shaped strip structures have good elasticity, and can deform to absorb the change in the distance between the first electrode terminal 111 of the first battery 11a and the second electrode terminal 112 of the second battery 11b. In still other embodiments, the buffer zone 215a is bent into a waveform structure, and the waveform structure is a sinusoidal waveform, a square waveform, a triangular waveform, or a sawtooth waveform. In yet other embodiments, the first busbar 21 is formed by combining a plurality of conductive materials, and elasticity of a material of the buffer zone 215a is better than elasticity of a material of another portion of the first busbar 21.

In some embodiments, the first busbar 21 further includes a second connection portion 214 and a second weak zone 216. The second connection portion 214 is connected to the second electrode terminal 112 of the second battery 11b. The second weak zone 216 at least partially overlaps with the explosion-proof piece 113 of the second battery 11b in the first direction, and the second weak zone 216 is connected to the transition portion 215 and the second connection portion 214. The second connection portion 214 is welded to the second electrode terminal 112 of the second battery 11b.

The second weak zone 216 is configured to fracture when the explosion-proof piece 113 of the second battery 11b is burst, to cause an open circuit between the first battery 11a and the second battery 11b.

When the electrode assembly 115 of the second battery 11b generates a large amount of gas due to overcharging, a short circuit, or the like, air pressure inside the casing 114 increases, and the explosion-proof piece 113 is burst. Because the second weak zone 216 at least partially overlaps with the explosion-proof piece 113, gas at high temperature and high pressure directly strikes the second weak zone 216; and the second weak zone 216 is less strong and fractures under the impact of the gas, thereby disconnecting the electrical connection between the first battery 11a and the second battery 11b. At this point, charging and discharging of the first battery 11a has been stopped. Even if heat of the second battery 11b is transferred to the first battery 11a, the first battery 11a is not prone to thermal runaway, thereby reducing a risk of safety incidents such as a fire or an explosion.

In some embodiments, the first busbar 21 is further provided with a second through hole 217. The second through hole 217 is provided, so that strength of the second weak zone 216 can be reduced in this application, thereby ensuring that the second weak zone 216 can fracture when the explosion-proof piece 113 is burst.

In some embodiments, the first busbar 21 is provided with a second groove. The second groove is provided, so that thickness of the second weak zone 216 can be decreased in this application to reduce the strength of the second weak zone 216, thereby ensuring that the second weak zone 216 can fracture when the explosion-proof piece 113 is burst. In some other embodiments, the first busbar 21 is provided with two second notches, and the two second notches are respectively located on two sides of the second weak zone 216. The second notches are provided, so that thickness of the second weak zone 216 can be decreased in this application to reduce the strength of the second weak zone 216, thereby ensuring that the second weak zone 216 can fracture when the explosion-proof piece 113 is burst. In still other embodiments, the first busbar 21 is formed by composing a plurality of conductive materials, and the strength of the second weak zone 216 is less than that of a portion of the first busbar 21 that is connected to the second weak zone 216, thereby ensuring that the second weak zone 216 can fracture when the explosion-proof piece 113 is burst. In yet other embodiments, the first busbar 21 is formed by composing a plurality of conductive materials, a melting point of the second weak zone 216 is less than that of a portion of the first busbar 21 that is connected to the second weak zone 216, and when the gas at the high temperature strikes the second weak zone 216, the second weak zone 216 is heated and softened, thereby ensuring that the second weak zone 216 can fracture when the explosion-proof piece 113 is burst.

In some embodiments, the buffer zone 215a is provided obliquely relative to the vertical direction and the horizontal direction. In a plane perpendicular to the first direction, a projection of an exposed edge of the buffer zone 215a is provided obliquely relative to the vertical direction Z and the length direction X. The oblique buffer zone 215a can deform to absorb the change in the distance in the vertical direction Z and the length direction X between the first electrode terminal 111 of the first battery 11a and the second electrode terminal 112 of the second battery 11b.

In some embodiments, the buffer zone 215a is located between the explosion-proof piece 113 of the first battery 11a and the explosion-proof piece 113 of the second battery 11b in the vertical direction Z. The first weak zone 211 and the second weak zone 216 are respectively located on two sides of the buffer zone 215a in the vertical direction Z and respectively cover the explosion-proof piece 113 of the first battery 11a and the explosion-proof piece 113 of the second battery 11b.

In some embodiments, the first electrode terminal 111 and the second electrode terminal 112 of the first battery 11a are arranged in the horizontal direction; and the first electrode terminal 111 and the second electrode terminal 112 of the second battery 11b are arranged in the horizontal direction. The first electrode terminal 111 of the first battery 11a and the first electrode terminal 111 of the second battery 11b are oppositely provided in the vertical direction, and the second electrode terminal 112 of the first battery 11a and the second electrode terminal 112 of the second battery 11b are oppositely provided in the vertical direction. The first battery 11a and the second battery 11b are provided in the same direction, thereby facilitating stacking of the first battery 11a and the second battery 11b.

As shown in FIG. 8, in some embodiments, the electrode assembly 115 is a winding structure. Specifically, the first electrode plate 115a, the second electrode plate 115b, and the separator 115c are all strip structures. The first electrode plate 115a, the separator 115c, and the second electrode plate 115b are sequentially laminated, and wound at least twice to form the electrode assembly 115. In addition, the electrode assembly 115 is flat-shaped. FIG. 8 is a schematic diagram of an outline of an electrode assembly 115. An outer surface of the electrode assembly 115 includes two flat surfaces 115d and two narrow sides 115e, the two flat surfaces 115d are opposite each other in the vertical direction Z, and the two narrow sides 115e are opposite each other in the length direction X. The flat surface 115d is roughly parallel to a winding axis of the electrode assembly 115 and is a surface with the largest area. The flat surface 115d may be a relatively flat surface, and is not required to be an absolutely flat surface. At least a portion of the narrow side 115e is arc-shaped. The flat surface 115d is flat relative to the narrow side 115e, and an area of the flat surface 115d is greater than an area of the narrow side 115e.

As shown in FIG. 9, in another embodiment, the electrode assembly 115 is a laminated structure. Specifically, the electrode assembly 115 includes a plurality of first electrode plates 115a and a plurality of second electrode plates 115b, and the plurality of first electrode plates 115a and the plurality of second electrode plates 115b are alternately laminated in the vertical direction Z. The separator 115c is disposed between the first electrode plate 115a and the second electrode plate 115b, and separates the first electrode plate 115a from the second electrode plate 115b. In the laminated structure, the first electrode plate 115a and the second electrode plate 115b are both sheet-shaped and roughly perpendicular to the vertical direction Z.

In a charge and discharge process of the electrode assembly 115, the electrode plate swells in its thickness direction. In the winding electrode assembly 115, swelling force in a direction perpendicular to the flat surface 115d is the largest; and in the laminated electrode assembly 115, swelling force in a lamination direction of the first electrode plate 115a and the second electrode plate 115b is the largest. It can be seen that regardless of whether the winding structure or the laminated structure is used for the electrode assembly 115, a direction in which the electrode assembly 115 applies the largest swelling force to the casing 114b is toward the vertical direction Z. That is, in the horizontal direction, swelling force applied by the electrode assembly 115 to the housing 114b is relatively small. In this application, a plurality of battery units 1 are arranged in the length direction X. Therefore, even if swelling force of all electrode assemblies 115 is superimposed in the length direction X, no excessive resultant force is generated, thereby reducing a risk of crushing the battery 11.

In some embodiments, a size of the battery module 1000 in the horizontal direction is greater than a size of the battery module 1000 in the vertical direction Z. Referring to FIG. 3 and FIG. 4, the size of the battery module 1000 in the length direction X is greater than the size of the battery module 1000 in the vertical direction Z. In this application, a quantity of batteries 11 of each battery unit 1 is decreased to reduce swelling force of each battery unit 1 in the vertical direction Z. Because expansion force of the battery 11 of each battery unit 1 in the length direction X is relatively small, the battery module 1000 may have a relatively large size in the length direction X. That is, there may be a relatively large quantity of battery units 11. In addition, limited by a height of a chassis of an electric vehicle, the battery module 1 may have a relatively small size in the vertical direction Z.

In some embodiments, the battery module further includes two end plates (not shown in the figure) and a tie (not shown in the figure). The two end plates are respectively provided at two ends of the plurality of battery units 1 in the length direction X, and the tie surrounds peripheries of the plurality of battery units 1 and the two end plates, thereby fixing the plurality of battery units 1. The end plate may be made of a metal material such as aluminum or an aluminum alloy, or may be made of an insulation material.

In some embodiments, referring to FIG. 3, the busbar assembly 2 further includes a second busbar 22, and the second busbar 22 connects a first electrode terminal 111 of a battery 11 of a battery unit 1 and a first electrode terminal 111 of a battery 11 of another battery unit 1. The second busbar 22 is provided obliquely relative to the vertical direction Z and the length direction X.

In some embodiments, there are a plurality of first busbars 21 and a plurality of second busbars 22, and the plurality of first busbars 21 and the plurality of second busbars 22 electrically connect all batteries 11 of the battery module.

In some embodiments, the busbar assembly 2 further includes two output electrode plates 23, and the two output electrode plates 23 are respectively connected to an electrode terminal serving as a total positive output and an electrode terminal serving as a total negative output in the battery module.

What is claimed is:

1. A battery module comprising:
    a plurality of battery units arranged in a horizontal direction, wherein each battery unit comprises a plurality of batteries stacked in a vertical direction, the plurality of batteries comprise a first battery and a second battery stacked in a vertical direction, the first battery and the second battery each comprise a first electrode terminal, a second electrode terminal, and an explosion-proof piece located between the first electrode terminal and the second electrode terminal; and
    a busbar assembly, configured to electrically connect the plurality of battery units, wherein the busbar assembly comprises a first busbar connected to the first electrode terminal of the first battery and the second electrode terminal of the second battery; wherein
    in a first direction perpendicular to the vertical direction and the horizontal direction, the first busbar comprises a first weak zone and a second weak zone, wherein the first weak zone is configured to fracture when an explosion-proof piece of the first battery is burst, to cause an open circuit between the first battery and the second battery, the second weak zone is configured to fracture when an explosion-proof piece of the second battery is burst, to cause an open circuit between the first battery and the second battery;
    in the first direction, the first weak zone at least partially overlaps with the explosion-proof piece of the first battery and does not overlap with the explosion-proof piece of the second battery, the second weak zone at least partially overlaps with the explosion-proof piece of the second battery and does not overlap with the explosion-proof piece of the first battery.

2. The battery module according to claim 1, characterized in that the first busbar further comprises:
    a first connection portion, connected to the first electrode terminal of the first battery; and
    a transition portion, wherein the first weak zone is connected to the first connection portion and the transition portion, and the transition portion has a buffer zone, wherein the buffer zone is configured to: flexibly deform when a distance in the horizontal direction between the first electrode terminal of the first battery and the second electrode terminal of the second battery changes; and/or flexibly deform when a distance in the vertical direction between the first electrode terminal of the first battery and the second electrode terminal of the second battery changes.

3. The battery module according to claim 2, wherein the first busbar further comprises:
    a second connection portion, connected to the second electrode terminal of the second battery; and
    the second weak zone is connected to the transition portion and the second connection portion.

4. The battery module according to claim 2, wherein the buffer zone is provided obliquely relative to the vertical direction and the horizontal direction.

5. The battery module according to claim 2, wherein the buffer zone is located between the explosion-proof piece of the first battery and the explosion-proof piece of the second battery in the vertical direction.

6. The battery module according to claim 2, wherein the buffer zone comprises a plurality of arched structures.

7. The battery module according to a claim 1, wherein:
the first electrode terminal and the second electrode terminal of the first battery are arranged in the horizontal direction;
the first electrode terminal and the second electrode terminal of the second battery are arranged in the horizontal direction; and
the first electrode terminal of the first battery and the first electrode terminal of the second battery are oppositely disposed in the vertical direction, and the second electrode terminal of the first battery and the second electrode terminal of the second battery are oppositely disposed in the vertical direction.

8. The battery module according to claim 1, wherein a size of the battery module in the horizontal direction is greater than a size of the battery module in the vertical direction.

9. The battery module according to claim 1, wherein:
each battery further comprises a housing and an electrode assembly, wherein the first electrode terminal, the second electrode terminal, and the explosion-proof piece are disposed at the housing, the electrode assembly is accommodated in the housing, the electrode assembly comprises a first electrode plate, a second electrode plate, and a separator separating the first electrode plate from the second electrode plate, the first electrode plate is electrically connected to the first electrode terminal, and the second electrode plate is electrically connected to the second electrode terminal; and
the electrode assembly is a flat-shaped winding structure, wherein an outer surface of the electrode assembly comprises two flat surfaces, and the two flat surfaces are opposite each other in the vertical direction; or the electrode assembly is a laminated structure, wherein the first electrode plate, the separator, and the second electrode plate are laminated in the vertical direction.

10. A battery pack comprising:
a box body; and
the battery module according to claim 1, accommodated in the box body.

11. The battery module according to claim 1, wherein
the first busbar further has a first through hole, the first weak zone comprises a first portion and a second portion, and the first portion and the second portion are respectively located on two sides of the first through hole;
in the first direction, the first portion at least partially overlaps with the explosion-proof piece of the first battery, and the second portion at least partially overlaps with the explosion-proof piece of the first battery.

12. The battery module according to claim 11, wherein the explosion-proof piece of the first battery has an exposed zone, and the exposed zone is not covered by the first busbar in the first direction.

13. The battery module according to claim 12, wherein the exposed zone comprises a first exposed portion facing toward the first through hole.

14. The battery module according to claim 13, wherein the exposed zone further comprises a second exposed portion, and the second exposed portion is spaced apart from the first exposed portion.

15. A battery module comprising:
a plurality of battery units arranged in a horizontal direction, wherein each battery unit comprises a plurality of batteries stacked in a vertical direction, the plurality of batteries comprise a first battery and a second battery stacked in a vertical direction, the first battery and the second battery each comprise a first electrode terminal, a second electrode terminal, and an explosion-proof piece located between the first electrode terminal and the second electrode terminal; and
a busbar assembly, configured to electrically connect the plurality of battery units, wherein the busbar assembly comprises a first busbar connected to the first electrode terminal of the first battery and the second electrode terminal of the second battery; wherein
in a first direction perpendicular to the vertical direction and the horizontal direction, the first busbar comprises a first weak zone that at least partially overlaps with an explosion-proof piece of the first battery and does not overlap with an explosion-proof piece of the second battery, wherein the first weak zone is configured to fracture when an explosion-proof piece of the first battery is burst, to cause an open circuit between the first battery and the second battery; the first busbar further comprises:
a first connection portion, connected to the first electrode terminal of the first battery; and
a buffer zone, wherein the first weak zone is located between the first connection portion and the buffer zone to connect the first connection portion and the buffer zone, and the buffer zone does not overlap with the explosion-proof piece of the first battery;
wherein the buffer zone is configured to: flexibly deform when a distance in the horizontal direction between the first electrode terminal of the first battery and the second electrode terminal of the second battery changes; and/or flexibly deform when a distance in the vertical direction between the first electrode terminal of the first battery and the second electrode terminal of the second battery changes.

* * * * *